United States Patent [19]

König

[11] Patent Number: 4,779,604

[45] Date of Patent: Oct. 25, 1988

[54] BAKING OVEN

[76] Inventor: Helmut König, Ursprungweg 70-72, Graz, Austria

[21] Appl. No.: 40,687

[22] PCT Filed: Aug. 8, 1985

[86] PCT No.: PCT/AT85/00023

§ 371 Date: Apr. 8, 1986

§ 102(e) Date: Apr. 8, 1986

[87] PCT Pub. No.: WO86/01077

PCT Pub. Date: Feb. 27, 1986

Related U.S. Application Data

[63] Continuation of Ser. No. 864,698, Apr. 8, 1986, abandoned.

[30] Foreign Application Priority Data

Aug. 8, 1984 [AT] Austria .................................. 2576/84

[51] Int. Cl.$^4$ ............................................... A21B 1/00
[52] U.S. Cl. .................................. 126/21 A; 219/400; 219/386; 34/197; 34/191
[58] Field of Search ............. 126/21 A; 219/400, 386; 432/25, 143, 144, 145, 149, 150, 133, 152, 199; 34/191, 23, 196, 238, 197; 312/236

[56] References Cited

U.S. PATENT DOCUMENTS

| | | | |
|---|---|---|---|
| 1,504,854 | 8/1924 | Baker | 34/196 |
| 1,527,193 | 2/1925 | Judelson | 34/196 |
| 2,757,920 | 8/1956 | Morris | 432/144 |
| 3,261,650 | 7/1966 | Stromquist | 219/400 X |
| 3,548,153 | 12/1970 | Kells | 126/21 A X |
| 3,658,047 | 4/1972 | Happel | 126/21 A |
| 3,861,378 | 1/1975 | Rhoads et al. | 219/400 X |
| 4,029,463 | 6/1977 | Johansson et al. | 219/400 X |
| 4,039,278 | 8/1977 | Denholm | 432/144 |

FOREIGN PATENT DOCUMENTS

| | | | |
|---|---|---|---|
| 2628430 | 12/1977 | Fed. Rep. of Germany | 165/919 |
| 1175501 | 11/1958 | France | |
| 2516351 | 5/1983 | France | |
| 2129269 | 5/1984 | United Kingdom | |

Primary Examiner—Carroll B. Dority, Jr.
Attorney, Agent, or Firm—Townsend and Townsend

[57] ABSTRACT

Into the baking chamber of a baking oven a carriage (7) carrying the baking goods (5) can be shifted in between two partition walls (13) having horizontal slots (14) through which hot air is blown into the baking chamber (4) in alternating directions. The carriage (7) carries channels (21) joining the slots (14) and being confined by guide sheet metal elements (20). By these channels (21) the air passing through the slots (14) is guided towards the center of the carriage and onto the baking good.

12 Claims, 1 Drawing Sheet

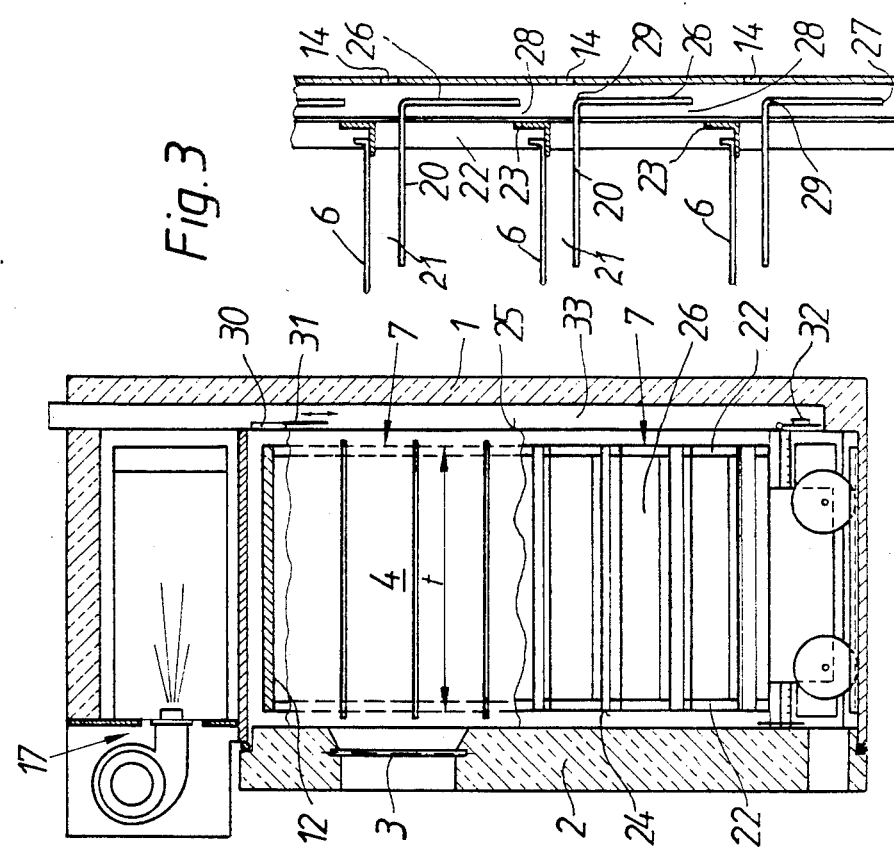

BAKING OVEN

This is a continuation of application Ser. No. 864,698, filed Apr. 8, 1986, now abandoned.

BACKGROUND OF THE INVENTION

The invention refers to a baking oven comprising a baking chamber into which a carriage can be shifted which carries the baking good on support members, in particular baking plates, and which is stationary during the baking process, noting that air channels extend at both sides of the baking chamber over the height of the baking chamber from top to bottom, which air channels are separated from the baking chamber by partition walls having provided therein air flow openings formed by horizontal slots preferably extending over the whole depth of the support members as measured in shifting direction of the carriage, heated air being blown in alternating direction into the baking chamber by means of a blower.

Such baking ovens comprising a carriage being stationary during the baking process suffer frequently from the drawback, that the baking good distributed over the support members of the carriage is not uniformely baked. Experiments have shown that the reason for this has its origin in the fact that the heated air supplied via one of both air channels, although emerging with high speed from the air flow passages, becomes rapidly decelerated and thus arrives at the baking good with only reduced and moreover—as seen over the cross section of the baking chamber—with ununiform velocity.

SUMMARY OF THE INVENTION

It is an object of the invention to avoid these drawbacks and to improve supply of heated air to the baking good such, that the heated air is supplied with high velocity to the baking good carried by the carriage and the heat supply to the baking good is uniform over the whole baking chamber. This object is achieved by the invention in that channels are provided on the carriage, which, in inserted position of the carriage, adjoin the associated slots and are delimited by baffle plates provided in addition to the support members, air blown into the baking chamber via said slots being guided by the channels in direction to the center of the carriage and onto the baking good. Said channels form in inserted position of the carriage some sort of continuation of the air flow openings provided in the partition wall, so that the air blown into the baking chamber via these openings enters said channels at least for the major part and becomes—corresponding dimensions of the cross section of these channels being provided—not substantially decelerated until this air arrives at the baking good. Surprisingly, it has been found that in this manner the baking good is uniformly subjected to the action of hot air and that the baking good becomes equally baked even if the air flow openings are less uniformily distributed over the surface of the partition walls than are walls usual up till now. Within the spirit of the invention it is now sufficient to provide slot-shaped air flow openings only at those locations where said mentioned channels of the carriage adjoin. Any additional air flow openings provided in the partition walls between said channels have no effect whatsoever.

Preferably and according to the invention, one slot each is arranged immediately below the support members, noting that the carriage carries below each slot a lying baffle plate limiting one of the channels together with the support member located above said baffle plate. Thereby, each support member forms one wall of a channel which results in saving construction material and furthermore in the advantage that the channels extend closely below the support members, so that the heated air flowing within the channels effectively heats the metallic support members (baking plates) for the dough portions to be baked and simultaneously the air is blown from above onto the dough portions located within the corresponding compartment of the carriage.

According to a further development of the invention, the baffle plate and the support member extend in direction of the jet of air emerging from the slot and in parallel relation one relative to the other and in horizontal direction. The cross section of the channel is thus kept at least substantially constant from its end located adjacent the air flow opening of the partition wall till its end directed to the center of the carriage, so that the speed of the air jet is substantially not changed along the length of this channel.

According to a preferred embodiment of the invention, the arrangement is such that a cover plate extends downwardly from that edge of the baffle plate, which faces the slot, and in direction to the support member located beneath the baffle plate. In this manner, also parasitic jets are utilized which enter the baking chamber via the airflow openings in the partition walls, because these parasitic jets can now no more enter the baking chamber and arrive at the baking good via the channels formed between the support members and the baffle plates but are passed by the downwardly directed sections of the baffle plates into the channels delimited by these baffle plates. It is within the scope of the invention, that the lower end of the cover plate is spaced apart a distance, preferably a horizontal distance, from the support members, the cover plate being located closer to the slot than the support member. The cover plate thus extends laterally outwardly from the carriage for some extent. This arrangement reliably provides an exit opening for the air flowing out of the baking chamber. It is particularly favourable if the cover plate passes over to the baffle plate via a bent portion. This facilitates introduction of the heated air into the interior of the carriage as well as evacuation of the consumed warm air out of the interior of the carriage in direction to the suction openings.

BRIEF DESCRIPTION OF THE DRAWINGS

In the drawing the object of the invention is schematically illustrated with reference to an embodiment.

FIG. 1 shows a vertical section through the baking oven, seen in normal direction relative to the direction of insertion of the carriage.

FIG. 2 is a section along line II—II of FIG. 1 and

FIG. 3 shows in a section similar to that of FIG. 1 and in an enlarged scale the arrangement of the baffle plate and of the cover plate.

DESCRIPTION OF THE PREFERRED EMBODIMENTS

The baking oven has a heat-insulated housing 1 which can be tightly closed by means of a door 2 being provided with an inspection window 3. The housing 1 encloses a baking chamber 4 into which can be inserted a carriage 7 carrying the baking good 5 on support members 6 being formed of baking plates. This carriage 7 can be completely shifted out of the baking chamber 4, therefore it can be completely separated from the baking oven. For this purpose, the carriage has a chassis 8, the wheels of which are guided on rails 9 provided on the bottom of the baking chamber for securing the relative position of the carriage 7 within the baking chamber 4. Within recesses 10 of the housing 1 on both sides of the chassis 8 there are provided means 11 for supplying baking atmosphere.

The baking chamber 4 itself is tightly closed on top by a cover wall 12, from which one partition wall 13 each extends at both sides of the carriage 7 and over the effective height of the baking chamber, that is that height of the carriage 7, over which the support members 6 are arranged one above the other at uniform distances. Each partition wall 13 has a plurality of horizontal air flow openings formed of slots 14 and extending over the whole depth t (FIG. 2) of the carriage 7 as measured in direction of inserting movement of the carriage 7. Heated air is alternately supplied to the slots 14 of both partition walls 13 via two air channels 15 being separated from the proper baking chamber 4 by the partition walls 13 and extending at both sides of the baking chamber 4 over its whole effective height. the horizontal cross section of these air channels 15 may decrease from top to bottom (FIG. 1). Air is alternately supplied from the top to both air channels 15, said air being supplied by means of a blower 16 and being heated by a heating means 17 of any desired type. In the embodiment shown, the heating means is formed of a burner system, the heating means can, however, also be formed of an electric heating system, and so on. The blower 16 can be a usual ventilator, but preferably is a cross-flow blower, the rotor of which has such a length that the air channels 15 extending at least over the depth t of the carriage 7 are uniformly supplied with air at all locations. Conveniently, the blower 16 and the heating means 17 are located above the baking chamber 4 and the air channels 15, respectively, in order to keep the width b (FIG. 1) of the oven construction small. For alternately supplying the air channels 15 with heated air, the sense of rotation of the blower 16 is, conveniently automatically, reversible. This results in an air stream flowing in direction of the arrows 18 shown in full lines alternating with an air stream flowing in direction of the arrows 19 shown in dashed lines (FIG. 1).

The slots 14 have only a comparatively small cross-sectional area, so that the heated air supplied to these slots via the air channels 15 enters the baking chamber 4 with high velocity from said slots 14. In order to ensure that this great velocity of the air is not substantially reduced prior to impingement of the heated air onto the baking good 5, the slots 14 are arranged at such a level that one slot 14 each is located closely below each support member 6. Furthermore, a baffle plate 20 is provided for each slot 14 and below the slot 14 for forming together with the support member 6 located above the associated slot 14 a channel 21 through which the air emerging from the slot 14 is supplied in direction to the center of the carriage 7. The sheet metal baffle 20 extends in horizontal direction and in parallel relation to the support member 6 and, as measured in direction of the width b of the baking oven, over approximately one fifth to one third, preferably to approximately one fourth, of the width of the carriage 7. The baffle plates 20 are carried by the carriage 7. For this purpose, the carriage 7 has at the four corners of its horizontal projection uprights 22 carrying L-guides 23 arranged in pairs one above the other and in equal distances, the support members 6 being inserted into these L-guides. The baffle plates 20 extend over the whole depth t (FIG. 2) of the carriage 7, i.e. from upright 22 to upright 22. In order to prevent escape of the heated air from the channels 21 at front locations and rear locations, as seen in direction of inserting movement of the carriage 7, the rear wall 24 of the carriage 7 can be closed by a plate and the front side 25 of the carriage 7 can be closed, for example by means of doors.

In order to prevent marginal jets of the heated air injected via the slots 14 from not being supplied through the channels 21 in direction to the interior of the carriage 7 and thus from arriving in an uncontrolled manner at the interior of the carriage 7 within residual area between the uprights 22, a cover plate 26 (FIG. 1,3) is connected with each baffle plate 20 and extends in downward direction from that edge of the baffle plate 20, which faces the slot 14. This cover plate 26 extends in downward direction and toward the support member 6 located below the baffle plate 20 to such an extent, that its lower end 27 (FIG. 3) is located at a somewhat higher level than the support member 6 located therebeneath and approximately at the same level as the upper edge of the L-guide 23 carrying the support member 6. On account of the cover plates 26 being located somewhat outside of the uprights 22, there remains a gap 28 between the upper edge of each L-guide 23 and the lower end 27 of the adjacent cover plate 26 which gaps extends over the whole depth t of the carriage 7 and provides an unobstructed flow passage for the air which is to be extracted from the interior of the carriage 7 and to be fed to the suction slot 14. Under normal conditions, the cover plate 26 extends downwardly in vertical direction, but the cover plate can also be slightly inclined for the purpose of adjusting the width of the gap 28. Conveniently, the cover plate 26 is formed integrally with plate 20 via a bent portion 29, so that both plates 20, 26 can easily be bent from one single piece and there results a well suitable guide means for the air.

A wet vapor exhaust opening 30 (FIG. 2) can be provided at the back wall of the baking oven and this opening can be closed by a slide plate 31 which can be adjusted in its height position in direction of the twin arrow, for example by means of a tackle. Furthermore, a vapor pressure relief opening 32 can be provided in the rear wall of the baking oven, said opening being closable by means of a lid. Said both openings 30, 32 provide the possibility to remove the wet vapors into a vapor exhaust channel 33 arranged in the back wall of the housing 1.

I claim:

1. A baking oven comprising:
   a housing;
   means for heating air;
   means, in fluid communication with the heating means, for blowing the heated air in alternating directions through a baking chamber;
   first and second partition walls disposed within and spaced apart from the housing for forming first and second air channels extending a substantial length from a top to a bottom of the housing, the first and second air channels being in fluid commuication with the blowing means for flowing heated air received from the blowing means, the first and second partition walls defining said baking chamber therebetween and having a plurality of apertures formed therein for flowing air from the first and second channels into the baking chamber;

a carriage disposed stationarily within the baking chamber, the carriage including a plurality of support members for carrying a baking good;

means forming a further air channel on both sides of said carriage and opposite each other, each air channel including a support member and having an air inlet opening at that side of the carriage which faces the neighboring partition wall, the air inlet opening being in fluid communication with one of said apertures, for forming an enclosed passage for guiding air flowing through said air inlet opening a substantial length toward a center of the carriage and above the baking good, and further air channel means having an air exit opening facing the center of the carriage and being positioned spaced apart from a side of the carriage; and a cover plate extending downwardly from that end of the further air channel means adjacent the aperture and towards the support member located beneath the further air channel means and forming with the support member located beneath the further air channel means a further opening for air flowing out of the interior of the carriage.

2. Baking oven according to claim 1 wherein one slot is arranged in each partition wall immediately below a support member and the carriage carries below each slot a lying baffle plate, the baffle plate together with the support member located above the baffle plate defining one of the further channels.

3. Baking oven according to claim 2 wherein the baffle plate and the support member extend in the direction of the jet of air emerging from the slot and in horizontal parallel relation to each other.

4. Baking oven according to claim 3, wherein the lower end of the cover plate is spaced apart from the support member, the cover plate being located closer to the partition wall than to the carriage, when measured in horizontal direction.

5. Baking oven according to claim 1, wherein the lower end of the cover plate is spaced apart a horizontal distance from the support member.

6. Baking oven according to claim 1, wherein the cover plate is integrally formed with the baffle plate via a bent portion.

7. Baking oven according to claim 1 wherein the apertures extend over the depth of the support members.

8. A baking oven comprising:
a housing;
first and second partition walls disposed within and spaced apart from the housing for forming first and second air channels extending a substantial length from a top to a bottom of the housing, the first and second partition walls defining a baking chamber therebetween and having pairs of opposed apertures therein for flowing air from the first and second channels into the baking chamber;
a carriage disposed stationarily within the baking chamber, the carriage including a plurality of baking plates vertically spaced from each other for carrying a baking good, each baking plate being disposed directly above a corresponding pair of opposed apertures;
a first baffle plate mounted in the carriage below each baking plate and in close proximity to the baking plate, the first baffle plate extending a substantial length toward a center of the carriage and forming with a lower surface of the baking plate a third enclosed air channel adjacent to and in fluid communication with the aperture in the first partition wall beneath the baking plate for guiding the air flowing through the third air channel a substantial length toward the center of the carriage and solely above the baking good;
a first cover plate extending downwardly from that end of the first baffle plate adjacent to the aperture in the first partition wall and toward the baking plate located beneath the first baffle plate and forming with the first baking plate located beneath the first baffle plate a further opening for air flowing out of the interior of the carriage;
a second baffle plate mounted in the carriage below each baking plate and in close proximity to the baking plate, the second baffle plate extending a substantial length toward the center of the carriage and forming with a lower surface of the baking plate, a fourth enclosed air channel adjacent to and in fluid communication with the aperture in the second partition wall beneath the baking plate for guiding the air flowing through the fourth air channel a substantial length toward the center of the carriage and solely above the baking good;
a second cover plate extending downwardly from that end of the second baffle plate adjacent to the aperture in the second partition wall and toward the baking plate located beneath the second baffle plate and forming with the baking plate located beneath the second baffle plate a further opening for air flowing out of the interior of the carriage; and
wherein the first and second baffle plates have free ends facing the center of the carriage for forming an air exit opening located in the center of the carriage, facing downwardly and being positioned spaced apart from the side of the carriage, through which air exit opening the air flows downwardly for impinging against the baking good.

9. The baking oven according to claim 8 further comprising means for alternately flowing air into one of the first or second air channels.

10. The baking oven according to claim 9 further comprising means for supplying a baking atmosphere to the baking chamber.

11. Baking oven according to claim 8 wherein the baffle plates extends horizontally and parallel to the baking plates over one fifth to one third, of the width of the carriage.

12. A baking oven comprising:
a housing;
means for heating air;
means, in fluid communication with the heating means, for blowing the heated air in alternating directions through a baking chamber;
first and second partition walls disposed within and spaced apart from the housing for forming first and second air channels extending a substantial length from a top to a bottom of the housing, the first and second air channels being in fluid communication with the blowing means for flowing heated air received from the blowing means, the first and second partition walls defining, with a cover wall and a rear wall of the housing, said baking chamber therebetween and having a plurality of apertures formed therein for flowing air from the first and second channels into the baking chamber, the blowing means being disposed above the baking chamber, the junctions of the rear wall of the housing with the partition walls and the cover wall being substantially air tight so that the heated air enters the baking chamber from one of the air channels and leaves the baking chamber through the other of the air channels;

a carriage disposed stationarily within the baking chamber, the carriage including a plurality of support members for carrying a baking good; and means forming a further air channel on both sides of said carriage and opposite each other, each air channel including a support member and having an air inlet opening at that side of the carriage which faces the neighboring partition wall, the air inlet opening being in fluid communication with one of said apertures, for forming an enclosed passage for guiding air flowing through said air inlet opening a substantial length toward a center of the carriage and above the baking good, the further air channel means having an air exit opening facing the center of the carriage and being positioned spaced apart from a side of the carriage; and a cover plate extending downwardly from that end of the further air channel means adjacent the aperture and towards the support member located beneath the further air channel means and forming with the support member located beneath the further air channel means a further opening for air flowing out of the interior of the carriage.

* * * * *